Figure 1:
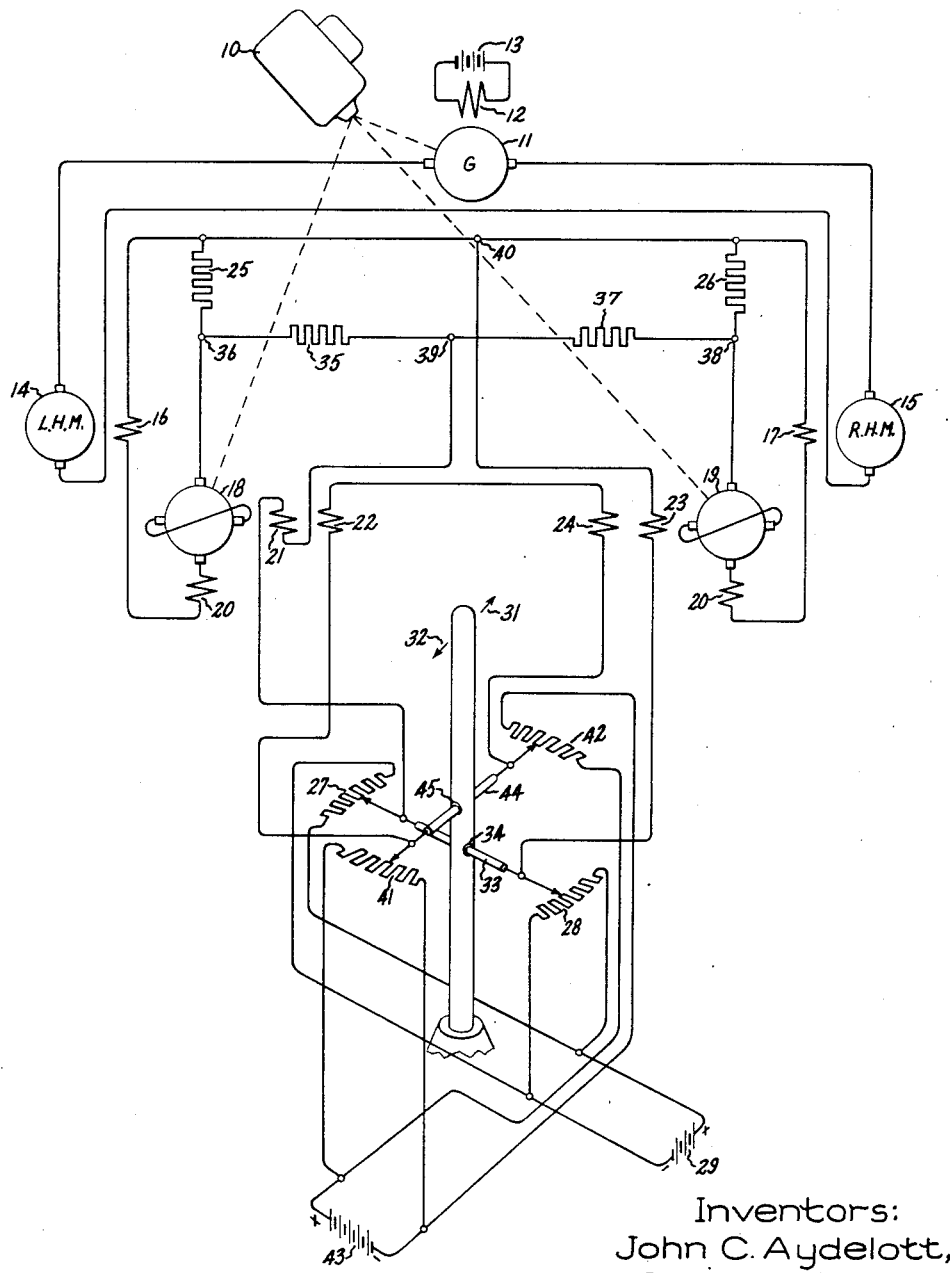

Aug. 21, 1951 J. C. AYDELOTT ET AL 2,565,293
CONTROL SYSTEM
Filed March 31, 1950 3 Sheets-Sheet 2
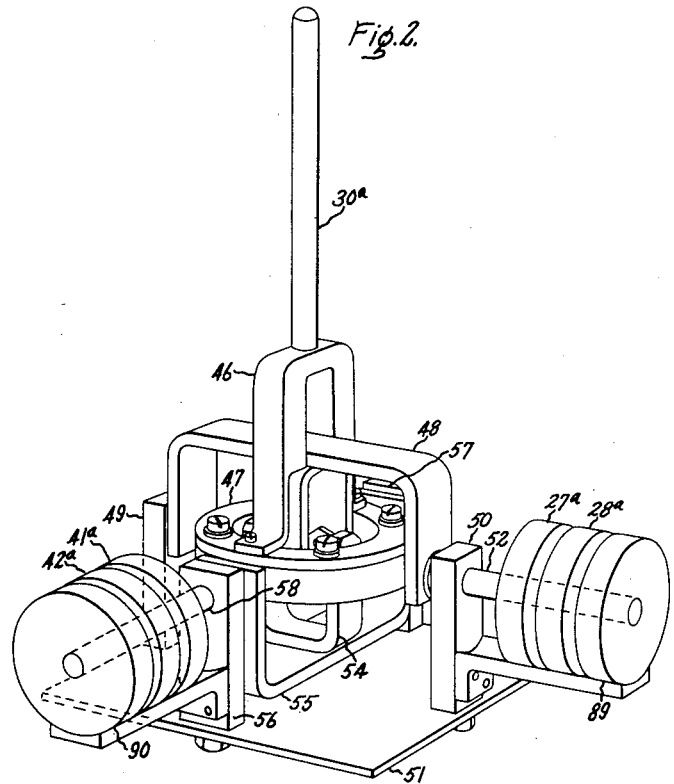
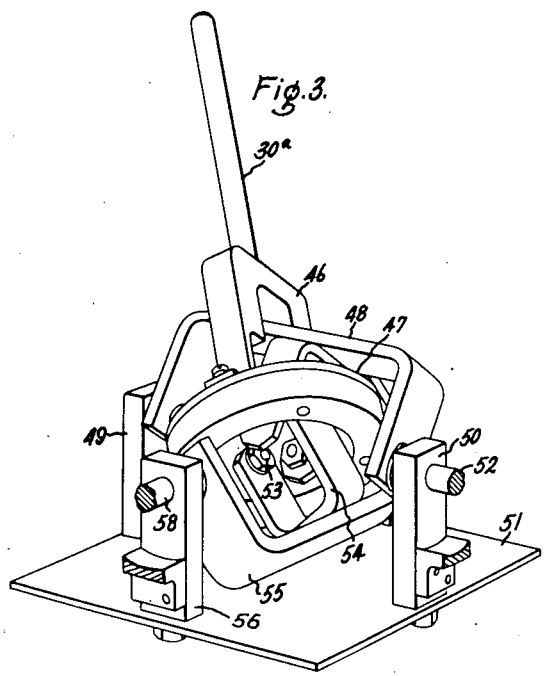
Inventors:
John C. Aydelott,
George W. Bower,
George M. Adams,
by Ernest C Britton
Their Attorney.

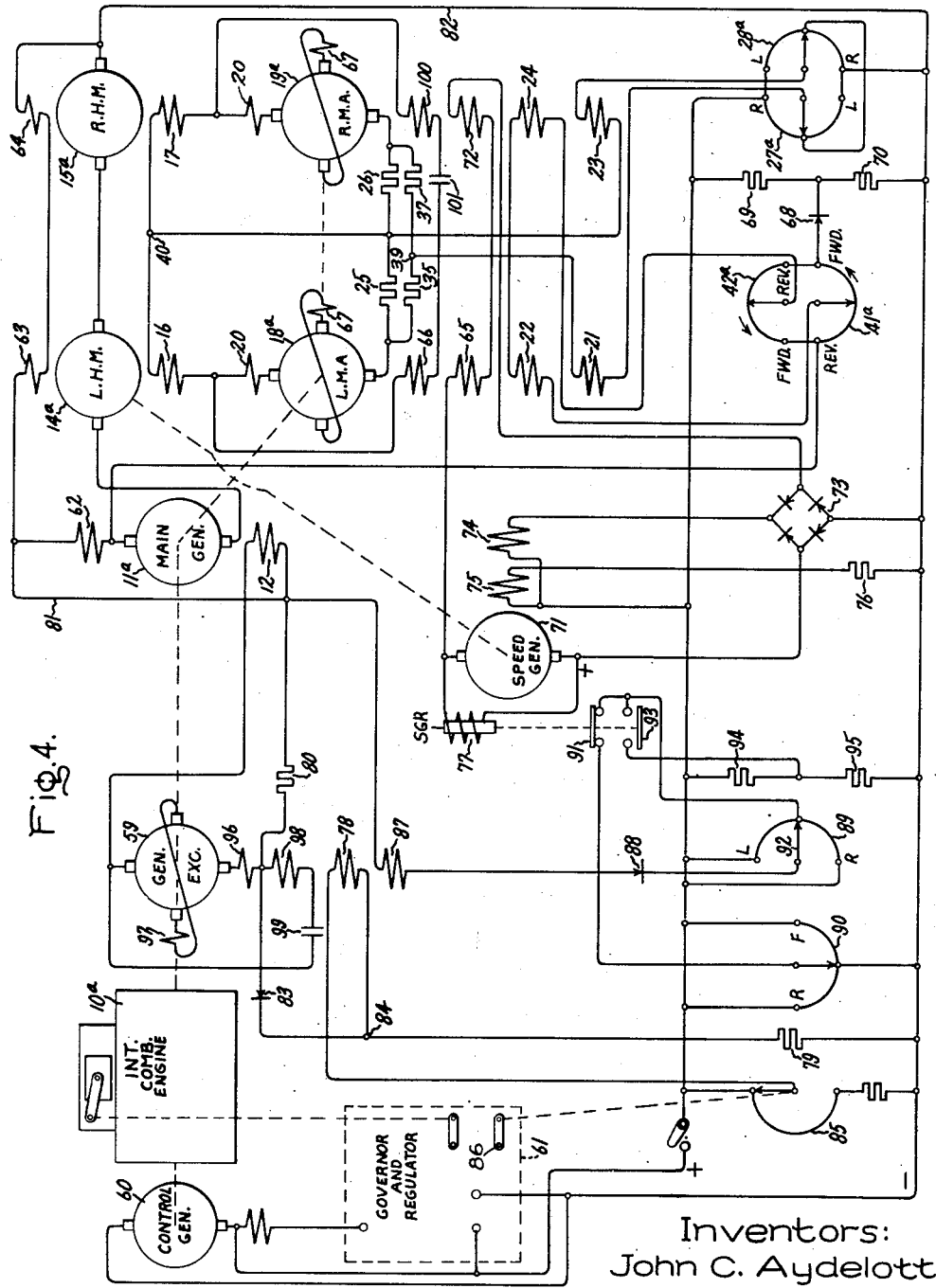

Patented Aug. 21, 1951

2,565,293

UNITED STATES PATENT OFFICE 2,565,293

CONTROL SYSTEM

John C. Aydelott, Lawrence Park, and George W. Bower, Danville, Pa., and George M. Adams, Seattle, Wash., assignors to General Electric Company, a corporation of New York Application March 31, 1950, Serial No. 153,184

9 Claims. (Cl. 318—68)

1

Our invention relates to control systems and has particular significance in connection with electric drive equipment for self-powered vehicles of the steerable type.

Heretofore, self-powered wheeled or track laying vehicles have conventionally had separate controls for steering and for forward and reverse movement. The present invention proposes a single "joy stick" for controlling both steering and forward or reverse movement of the vehicle, such unitary supervisory control being permitted by the provision of separate electrical drives at opposite sides of the vehicle together with improved means for corelating permissible line current and available torque with supervisory control positioning.

It is a principal object of the present invention to provide an improved control system for a steerable electric drive vehicle together with an improved motor excitation system.

Another object of this invention is to provide an improved generator excitation circuit having a sharp speed limit in any direction of travel and a current limit which is recalibrated according to the position of a master controller such as the joy stick mentioned above.

A further object of the present invention is to make available to the operator of a steerable vehicle, full motor torque at any time that he is definitely trying to move or turn it, while at any time that he places the master controller adjacent the no torque position, the apparatus will be protected from damaging current values.

Another object of the present invention is to provide in a single control lever, means for operating a vehicle forward, backward, or steering to the left or to the right, with a definite current limit modulated according to position of said control lever.

Other objects and advantages will become apparent and our invention will be better understood from consideration of the following description taken in connection with the accompanying drawing in which Fig. 1 is a simplified diagram of the mechanical arrangement of a rheostat controlling joy stick together with a schematic electrical circuit diagram of an electric power system embodying a portion of our invention; Fig. 2 is a perspective view of a modified type of rheostat controlling joy stick shown in the neutral or no torque position; Fig. 3 is a perspective view of the device of Fig. 2 shown at its extreme limits of travel simultaneously in two directions; and Fig. 4 is a schematic circuit diagram of connections for a modified electric power system fully embodying the electrical aspects of our invention.

2

Referring now to the drawing and particularly to Fig. 1, we have illustrated schematically therein a gas electric power system for a self-propelled vehicle having a prime mover 10 (such as a Diesel engine) arranged to drive a main generator 11, provided with a field exciting winding 12 adapted to be separately excited as by a battery 13. An output circuit from the armature of the generator 11 is completed through the armatures of a pair of traction motors 14 and 15, each provided with a separately excited field winding 16 and 17, respectively. Engine 10 is also arranged to drive a plurality of traction motor exciters 18 and 19. For purpose of illustration, it may be assumed each motor 14, 15 is arranged to drive the track on one side of a track-laying vehicle, such as a farm tractor. For example, the motor 14 (marked L. H. M.) may drive the left hand track while the R. H. M. motor 15 drives the right hand track.

Preferably, the exciters 18 and 19 are direct current generators of the so-called amplidyne type described and claimed in Patent 2,227,992, issued January 7, 1941, on an application filed by Ernest F. W. Alexanderson and Martin A. Edwards, and assigned to the assignee of the present invention. Such a generator is of the armature reaction excited type often referred to as an amplidyne, and is provided with a pair of load current supply brushes, a series load compensating winding 20, a pair of short circuited brushes, and one or more control field windings (such as those marked 21 and 22 for amplidyne 18, and 23 and 24 for amplidyne 19). The control field windings are arranged to generate a voltage between the short circuited brushes and the armature reaction of the current flowing as a result sets up a flux in such a direction as to provide an output voltage at the load brushes proportional to the excitation of the machine. One of the desirable characteristics of an amplidyne type of armature reaction excited generator is that its output voltage responds very rapidly and with a very high degree of amplification to change in the energization of the control field excitation. The output of amplidyne exciter 18 is adapted to effect the energization of motor field winding 16 by its connection thereacross in series with a fixed resistance 25. Similarly, the output of amplidyne 19 supplies energization to motor field winding 17 by being connected thereacross in series with a fixed resistance 26. The dual control fields for each amplidyne exciter are provided so that separate amplidyne fields are used for steering and for forward and reverse control. Thus fields 21 and 23 are steering fields adapted to be simultaneously energized to a greater or less degree, and actually reversed by their interconnection to voltage dividing or potentiometer rheostats indicated generally at 27 and 28, respectively. These voltage dividing rheostats are arranged to be oppositely energized from a constant voltage source (such as a battery 29) and the movement of the taps thereon is affected by movement of the joy stick 30 to the right as indicated by arrow 31, or to the left as indicated by arrow 32. A lever 33 adapted to move these taps is slidably disposed with a clearance fit through a hole 34 in stick 30.

In order to regulate to the proper differential of excitation of one motor with respect to that of the other (thereby to turn the vehicle), control field 21 is connected through a resistance 35 to a point 36 between the armature of amplidyne exciter 18 and resistance 25, and through a resistance 37 to a point 38 between the armature of amplidyne exciter 19 and the resistor 26. Resistors 35 and 37 are identical so that the potential of a point 39 at the adjacent side of winding 21 has a voltage always midway between that of point 36 and point 38, neglecting the effect of current in or out of point 39 through the amplidyne field 21. The steering control field 23 is connected through a common point 40 and then through resistors 25 and 26, respectively, to the points 36 and 38.

Meanwhile forward or reverse excitation is supplied to fields 22 and 24 of the amplidyne exciters by their respective interconnection to voltage dividing rheostats 41 and 42 cross connected to a battery 43 and having taps operated by a pin 44 which (similar to pin 34) is slidably disposed in a hole 45 in stick 30.

If the outputs of both exciters are equal the IR drop across resistance 26 will be the same as the drop across resistance 25 and the potential of the point 40 common to the two resistors will also (like that of point 39) be midway between that of point 36 and of point 38. If the steering control is centered as shown in Fig. 1, no voltage is applied between the taps of rheostats 27 and 28 and no current passes through the steering fields unless the amplidyne exciters have different characteristics, in which event the currents through the motor fields 16 and 17 will differ, and the potential of point 40 will not be midway between of point 36 and 38, and current will be forced through the exciter steering fields in the proper direction to correct the error. Because of the reversed connection from battery 29 to the ends of rheostat 27 with respect to those to the ends of rheostat 28, unbalancing or differential voltage is introduced in the field circuit when the operator desires to steer by throwing stick 30 to the left in the direction of arrow 32 or to the right in the direction of arrow 31. This unbalancing voltage causes current to flow in the steering fields 21 and 23 thereby increasing the net field excitation of one motor and (assuming some forward or reverse excitation) decreasing or reversing that of the other. The differential voltage introduced by the steering rheostat is many times greater than that required to unbalance the amplidyne exciters the desired amount. However, as the field currents become different, the drop across 26 becomes different from the drop across 25 and a voltage occurs between points 39 and 40 in a direction to oppose the voltage introduced by the steering rheostats. The unbalancing continues to the place where there is just enough unopposed differential voltage to provide the excitation necessary to produce the called for unbalancing, and this regulating action allows the use of exciters with considerable variation in characteristics without seriously effecting overall performance.

Control of forward and reverse motion utilizes the fields 22 and 24 of the amplidyne exciters and these fields are excited with current as the control stick 30 is moved forward to make the tap on rheostat 41 more positive and the tap on rheostat 37 more negative, inasmuch as these rheostats are cross-connected to a direct current source of supply such as a battery 45. It will be obvious that when the control lever is pulled backward past the mid position, the current in the exciter fields will be reversed and as soon as this effect overcomes any effect of the steering fields, current through the motor fields 16 and 17 will be reversed first to produce a braking effect and ultimately to cause the motors to reverse their direction of rotation. Those skilled in the art will realize that the schematic representation of left and right hand motors is merely symbolic for motors which normally face outward in opposite direction and that direction of rotation (on the schematic) will be opposite for the two motors for a given linear motion of the vehicle.

It should be understood that the mechanical representation of the joy stick and associated rheostats shown in Fig. 1 is purely diagrammatic and it may be found desirable to use a different type of mechanism permitting the use (for each direction of movement) of any number of standard circular and shaft operated rheostats. Such a device is shown in Figs. 2 and 3, being shown in Fig. 2 in the fully centered position, and in Fig. 3 at its full limit of travel simultaneously in two directions. The mechanism of Figs. 2 and 3 comprises a joy stick 30a having a bifurcated end portion 46 which engages an orbit ring 47. Bifurcated end portion 46 engages and slides fore and aft along a fore and aft extending yoke 48 which is journaled in fore and aft posts 49 and 50 secured to a base 51. Yoke 48 carries with it a shaft extension 52 on which the steering rheostats (hereinafter referred to) are mounted to be operated by left or right movement of stick 30a, its end portion 46, yoke 48 and shaft 52. Orbit ring 47 carries inwardly extending fore and aft stub shafts 53 (visible only in Fig. 3) journaled in an inner yoke 54 solidly secured to a transverse yoke 55 which is journaled in side posts 56 and 57 secured to base 51. A shaft 58 operatively associated with transverse yoke 55 is adapted to operate a plurality of forward and reverse rheostats as hereinafter described. It will be apparent from the drawing that the device shown in Fig. 2 and Fig. 3 is adapted to move 45 degrees from the vertical in any direction. Movement is possible in two directions simultaneously or independently and any number of rheostats may be associated with each movement.

The simplified circuit diagram of Fig. 1 is, in some applications, disadvantageous in that no line current control is provided. However, means allowing such regulation is hereinafter fully detailed in connection with Fig. 4, showing an internal combustion engine 10a adapted to drive a main generator 11a, a generator exciter 59, a left motor amplidyne exciter 18a, a right motor amplidyne exciter 19a, and an auxiliary generator 60 adapted to feed through a conventional engine governor and voltage regulator mechanism 61 to provide control power for the system. Exciter 59 is, as shown, of the amplidyne type and adapted to energize separately excited field winding 12 of generator 11a. If desired, the main machines may be provided with commutating windings such as generator (11) commutating field winding 62 arranged in the loop circuit including the generator armature, left motor armature 14a, right motor armature 15a, and motor commutator field windings 63 and 64.

The motor amplidyne exciters each have a plurality of field windings. For example, for the left motor exciter the fields comprise 20, 21, 22, 65 and 66, with the cumulative effect of these direct axis windings generating a voltage between the short circuited brushes so that, as described in connection with Fig. 1, an output voltage will appear at the load brushes. The field windings 20 are (as before) each a series load compensating winding for neutralizing the armature reaction of the exciter load current, and the motor exciters are shown each provided with a cross-axis series field winding 67 which serves to increase the cross-axis excitation without increasing the short circuit current. The field 22 (for the one exciter) and the field 24 (for the other) correspond to the forward and reverse fields 22 and 24 of Fig. 1, except that these fields in Fig. 4 are excited from FR rheostats 41a and 42a through a blocking rectifier 68 from the difference between the IR drop across the commutating pole fields 62—64 and a fixed voltage determined by the values of a pair of resistances 69 and 70 across the control voltage regulated supply from auxiliary generator 60, to provide a line current control equivalent to the commutating pole voltage drop corresponding to a predetermined minimum permissible line current. This means that there will be no current in the motor amplidyne exciter fields 22 and 24 (Fig. 4) unless the loop circuit current is some appreciable predetermined value (the minimum permissible line current feature). The fields 22 and 24 get no excitation if the line current is below this value, but a slight rise in line current will produce enough excitation to keep the loop current down with the vehicle operated at top speed. If due to terrain the vehicle slows down while the operator is still calling for maximum performance, more excitation is required to sustain motor back E. M. F., so the line current rises until the vehicle is stalled to a stop when full excitation is applied. When the fields 22 and 24 of Fig. 4 (corresponding to 22 and 24 of Fig. 1) are energized from rheostats 41a and 42a, the tap on one affords increasing potential for the same direction of movement which affords to the tap on the other decreasing potential, it being assumed that rheostats 41a and 42a are mounted on one shaft (as shown on shaft 58 of Fig. 2).

The vehicle is steered by modulating or reversing the current flow in steering fields 21 and 23 (Fig. 4) by means of additional rheostats 27a and 28a mounted on another shaft (as shown on shaft 52 of Fig. 2). Similar to the arrangement of Fig. 1, in Fig. 4 the resistances 25 and 26 and 35 and 37 are tied into the steering fields 21a and 23a which are energized from steering rheostats 27a and 28a, which in Figs. 2-4 are shown as both of the circular type. Since these rheostats are assumed attached to a common shaft, for any direction of side-wise movement of the associated control stick, the tap on one rheostat will become more positive while the tap on the other rheostat becomes more negative.

Sharp speed limit in both directions is obtained by comparing the voltage generated by a speedometer or tachometer generator 71 with a fixed voltage (such as 14 volts) used for control power and derived as the regulated output of auxiliary generator 60. This difference (of tachometer output less control voltage) is applied to the left motor amplidyne field 65 and to a similar right motor amplidyne field 72. To prevent feed-back (which would tend to drive the tachometer as a motor) a full wave rectifier 73 is inserted connected in the output of the tachometer (in series with the speed limiting fields 65 and 72 of the motor amplidyne exciters) and cross connected in series with a field 74 (of tachometer generator 71) across the source of control voltage. As shown the speedometer generator 71 may be driven by left motor 14a (since the differential in speed of the two motors is not important at high speed). In addition to field 74, excitation for the speedometer generator 71 is also obtained through a separately excited field 75 energized from the control voltage through a resistor 76. The field 74 is a substantially series connected field connected in series with the output through rectifier 73 and this field acts as a boot strap field and provides sharpness in both directions so that, when the motor fields are weakened and reversed, the motor torque is quickly weakened and reversed. Current passes through the boot strap field 74 in such a direction as to aid the tachometer separately excited field 75 resulting in an increase in total flux with a rise in tachometer generator voltage. Thus direction consciousness is obtained in the amplidyne fields but not in the tachometer generator boot strap field.

The output of the tachometer generator is also applied to coil 77 of a speed governing relay SGR to prevent violating the speed limit by centering the handle. Relay SGR picks up near the top speed of the tachometer generator to apply a limit slightly above the normal high speed line current as hereinafter described in connection with the variable current and braking features.

Reliable generator characteristics are obtained by means of another regulating circuit. Generator excitation is primarily derived from the generator amplidyne exciter 59 which has a direct axis field 78 connected across the control voltage in series with a resistance 79 selected to afford more generator amplidyne exciter excitation than will ever be required. Even so, the voltage across the field is still a small fraction of the control voltage so that most of the control voltage occurs across resistor 79. The main generator field 12 is connected across the output of exciter 59 in series with a resistor 80 so that a voltage proportional to generator field current appears across this resistor. Through a connection 81 from this resistor to a point in the loop circuit and through a connection 82 from the other side of the motor E. P. fields 63 and 64 back to control negative, this voltage across resistance 80 is added to the commutating pole voltage (proportional to loop circuit current) and the sum compared through a rectifier 83 to the substantially fixed voltage across the resistance 79. When this sum exceeds the voltage across 79, the potential at a point 84 (adjacent field 78) is increased, leaving less voltage for the exciter field 78 and reducing excitation until a stable condition is reached.

If desired, load control may be obtained by tieing the connection to the positive control voltage source from field 78 through a rheostat 85 arranged to be operated responsive to movement of the engine throttle or (as shown) responsive to actuation of a conventional shaft 86 on the governor and regulator 81, thereby to reduce the voltage with which the sum of the voltages proportional to field current and line current are compared, whenever the governor is unable to sustain called for engine speed by increasing fuel.

For current limiting, the commutating pole voltage (from connections 81, 82) is applied to an additional generator amplidyne exciter direct axis field 87 after being compared through a rectifier 88 with the voltage normally controlled by an additional rheostat 89 mounted on the LR shaft 52 (see Fig. 2) to be responsive to sidewise movement of the control stick. Thus, whenever the commutating pole volts exceed the reference voltage (from rheostat 89) current flows through exciter field 87 in such direction as to reduce generator excitation. An additional rheostat 90 is mounted on the FR shaft 52 (see Fig. 2) to be responsive to fore and aft movement of the control stick and as shown in Fig. 4, the movable arm of this rheostat is tied through a normally closed contact 91 to the midpoint of the rheostat 89.

It will be obvious that current limit of the system will be adjusted according to the position of the joy stick with the current limit gradually modulated to the maximum current value as the joy stick is moved radially outward from the center of the square. With SGR dropped out rheostat 90 will apply low voltage through an SGR contact 91 to rheostat 89 when the stick is centered fore and aft and high voltage at either end of stick forward or reverse movement. If the stick is centered from side to side (this movement operating rheostat 89) this high or low voltage determined by the position of rheostat 90 (operated by fore and aft movement of the stick) is the reference voltage with which commutating pole drop volts are compared. When this voltage is high (i. e., stick away from midposition) the line current limit is high and the limit is low when this voltage is low. With steering however, movement of rheostat 89 raises the voltage at its pointer 92 (the reference voltage) if it is not already maximum. This allows full line current for maximum steering.

The variable current limit feature (which will reduce current to near zero when the control stick is centered) is voided by means of relay SGR to prevent violating the speed limit by centering the handle when coasting down a steep hill. For braking, the motors may be provided with reverse excitation and the engine and generator allowed to absorb enough pump back energy to provide braking with the motors acting as generators and the generator acting as a motor.

However, electric braking is possible only if there is line current. The SGR relay makes sure that there is line current whenever the speed limit applies braking. As previously explained this relay is energized from the speedometer generator and picks up near top vehicle speed to open contact 91 and cut out rheostat 90. Meanwhile a normally open SGR contact 93 closes to tap the midpoint of rheostat 89 to a point between two unequal resistances 94 and 95 across the control voltage thereby applying a limit slightly above the normal high speed line current limit when the stick is centered in the side to side direction, but which is raised by rheostat 89 for extreme steering.

As shown, the amplidyne exciter 59 for the main generator is provided with a direct axis series load compensating field exciting winding 96 (comparable to field 20 of each motor amplidyne exciters) and a quadrature axis series field winding 97 (comparable to each motor amplidyne exciter field 67). In Fig. 4, the generator exciter is also shown provided with a direct axis shunt field winding 98 connected through a capacitor 99 across the terminals of the direct axis output of the machine to provide stabilizing in conventional manner. Similarly the motor amplidyne exciters may be stabilized through substantially shunt connected field windings (such as 66 and a similar field 100 for the other motor exciter) coupled together through a common capacitor 101, with this circuit common to both motor amplidyne exciters allowing unrestrained steering response, but restrained change of net motor excitation. With this arrangement, whenever the operator is definitely trying to move or turn the vehicle he will always be able to quickly obtain full motor torque. On the other hand if braking is suddenly called for at high vehicle speed, the response of the motors will be slowed down by the capacitor 101 to a rate which can be matched by the current limiting field of the generator exciter, thus avoiding damaging current values, commutator flashover, etc.

The control described provides steering, braking and forward and reverse movement control from a single control handle, a feature which will appeal to most drivers whether of farm tractors, military tanks, pleasure cars or other steerable vehicles.

While we have illustrated and described particular embodiments of our invention by way of illustration, many modifications will occur to those skilled in the art. We desire it to be understood, therefore, that our invention is not to be limited to the particular arrangements disclosed, and we intend in the appended claims to cover all modifications which fall within the true spirit and scope of our invention.

What we claim as new and desire to secure by Letters Patent of the United States is:

1. In a power system for a self-propelled steerable vehicle having a prime mover, a generator adapted to be driven by said prime mover, a pair of motors having their armatures connected in the output circuit of said generator and their fields adapted to be separately energized, motor field energizing means for separately regulating the excitation of each of said motors, and a single control stick adapted to be moved to the left or right of a center position and connected to said motor field energizing means to increase the excitation on one of said motors and simultaneously to decrease the excitation on the other of said motors responsive to said left and right movement for steering said vehicle, said control stick being adapted to be simultaneously moved fore or aft of said center position and connected to said motor field energizing means to reverse the excitation on both of said motors responsive to said fore and aft movement for controlling forward and reverse movement of said vehicle.

2. In a self-propelled vehicle having a pair of laterally spaced driving elemnts, a pair of direct current motors respectively arranged to separately drive said driving elements, a direct current generator arranged to supply current to the interconnected armatures of said pair of motors, a prime mover adapted to drive said generator, each of said motors having a separately excited field exciting winding, separate dynamoelectric exciter machines adapted to be driven by said prime mover and to energize the respective motor field exciting windings, each of said dynamoelectric exciter machines having a first control field winding and a second control field winding, supervisory control means adapted to be positioned simultaneously or independently through first and second planes, means for simultaneously energizing said first control field winding on each of said exciter machines responsive to supervisory control positioning through one of said planes, and means for simultaneously and inversely energizing said second control field windings on said exciter machines responsive to supervisory control positioning in the other of said planes.

3. A control system for a steerable gas electric vehicle having separate motor driven left and right hand driving elements, motors for said elements having their armatures connected in a loop circuit; motor field exciting means comprising forward and reverse exciting means for each of said motors arranged to simultaneously affect the energization of said motors for controlling forward and reverse movement of said vehicle, and steering exciting means for each of said motors differentially arranged to simultaneously increase the net field excitation of one motor and decrease the net field excitation of the other for steering said vehicle, single lever supervisory control means operatively connected to vary all of said motor field exciting means, and means for balancing a voltage responsive to current in said motor armature loop circuit against a fixed voltage to provide a voltage for energizing said forward and reverse exciting means whereby said forward and reverse exciting means is not energized unless minimum line current is flowing.

4. A power system for a self-propelled electric vehicle having left hand driving elements and right hand driving elements, said system comprising a prime mover, a direct current generator adapted to be driven by said prime mover, a plurality of motors having their armatures connected to the output of said generator, a separately excited field winding for each of said motors, separate exciter machines adapted to be driven by said prime mover each to separately energize one of said motor field exciting windings, a first control field winding for each of said exciters, a second control field winding for each of said exciters, direct current supply for energizing said exciter field windings, control means for modulating the energization supplied to said exciter field windings, and means including a bridge circuit associated with said control means for regulating the proper differential of excitation of one motor with respect to that of another, said bridge circuit including a pair of substantially identical resistors each having one end thereof connected to the same exciter field winding and the other end thereof connected to the armature circuit of a different one of said exciters, and another pair of resistors each having one end connected to another of said field exciting windings and the other end thereof connected to the armature circuit of a different one of said exciters.

5. An electrical control system for a self-powered vehicle of steerable type having a prime mover, a main generator adapted to be driven thereby, and a plurality of motors adapted to be energized by being connected in loop circuit with said main generator, said plurality including at least one right hand vehicle motor and one left hand vehicle motor, said control system comprising in combination a separately excited field winding for each of said motors, an exciter generator for each of said motor field windings, each of said exciters having at least two direct axis control field exciting windings, one a steering control winding and the other a forward and reverse control winding, a source of control power, a joy stick operable in any direction away from a common neutral position, a plurality of separate rheostat means adapted to be operated in common by said joy stick and each interposed between one of said steering fields and the associated source of control power for simultaneously energizing said fields with movement of said joy stick to one side or the other, a plurality of separate rheostat means adapted to be operated in common by said joy stick and each interposed between one of said forward and reverse fields and the associated source of control power for simultaneously energizing said fields with forward or backward movement of said joy stick, two like resistances one connected between the output of the left motor exciter and the field exciting winding for said motor and the other connected between the output of the right motor exciter and the field winding for said motor, an additional pair of resistors similar to each other each having one end connected to the same exciter steering field and the other end connected to a different one of said first mentioned resistances, and connections from the other exciter field to the opposite ends of each of said first mentioned resistances, whereby the proper differential of excitation may be maintained for either motor with respect to that of the other to provide a regulating action allowing the use of exciters having variation in characteristics without seriously effecting overall performance.

6. An electrical control system for a self-powered vehicle of steerable type having a prime mover, a main generator adapted to be driven thereby, a field exciting winding for said generator, a generator amplidyne exciter arranged to energize said field winding, a left hand vehicle drive motor and a right hand vehicle drive motor each connected in loop circuit with said main generator, a generator exciter adapted to be driven by said prime mover, a left motor amplidyne exciter adapted to be driven by said prime mover, a right motor amplidyne exciter adapted to be driven by said prime mover, an auxiliary control generator adapted to be driven by said prime mover, means for regulating the output of said control generator to provide a substantially constant voltage source of control power, each of said amplidyne exciters having a series load compensating winding and a cross axis series field winding, each of the motor amplidyne exciters having in addition a forward and reverse control field, rheostat means for simultaneously and inversely energizing said forward and reverse amplidyne fields, connections from said rheostat means through a blocking rectifier to said source of control voltage in series with a portion of said generator and motor loop circuit to be responsive to voltage drop thereacross thereby to provide line current control, each of the motor amplidyne exciters having in addition a steering field, rheostat means for simultaneously energizing said steering fields from said source of control power, resistance means connected in circuit with said steering fields and in circuit with the output of said motor amplidyne exciters for maintaining the proper differential of excitation of either motor with respect to that of the other, speed limiting means comprising a tachometer generator adapted to be driven substantially responsive to movement of said vehicle, additional motor amplidyne exciter control fields connected to the output of said tachometer, and field exciting means for said tachometer generator including a shunt field winding adapted to be energized from said source of control voltage and a series field winding adapted to provide additional excitation cumulative with the excitation produced by said shunt field winding for either direction of current flow from the output of said tachometer generator.

7. An electrical control system for a self-powered vehicle of steerable type having a prime mover, a main generator adapted to be driven thereby, a field exciting winding for said generator, a generator amplidyne exciter arranged to energize said field winding, a plurality of field windings for said generator exciter, a left hand vehicle drive motor and a right hand vehicle drive motor each connected in loop circuit with said main generator, a generator exciter adapted to be driven by said prime mover, a left motor amplidyne exciter adapted to be driven by said prime mover, a right motor amplidyne exciter adapted to be driven by said prime mover, an auxiliary control generator adapted to be driven by said prime mover, means for regulating the output of said control generator to provide a substantially constant voltage source of control power, each of said motor amplidyne exciters having a forward and reverse control field, rheostat means for simultaneously and inversely energizing said forward and reverse amplidyne fields, connections from said rheostat means through a blocking rectifier to said source of control voltage and in series with a portion of said generator and motor loop circuit to be responsive to voltage drop thereacross thereby to provide rheostat modulated line current control, each of the motor amplidyne exciters having in addition a steering field, rheostat means for simultaneously and inversely energizing said steering fields from said source of control power, resistance means connected in circuit with said steering fields and in circuit with the output of said motor amplidyne exciters for maintaining the proper differential of excitation of either motor with respect to that of the other, speed limiting means comprising a tachometer generator adapted to be driven substantially responsive to high speed movement of said vehicle, additional motor amplidyne exciter control fields connected to the output of said tachometer, field exciting means for said tachometer generator including a shunt field winding adapted to be energized from said source of control voltage and a rectifier series field winding combination adapted to provide additional excitation cumulative with the excitation produced by said shunt field winding for either direction of current flow from the output of said tachometer generator, additional rheostat means adapted to operate simultaneously with said rheostat means for energizing said steering fields, and a speed governing relay having a coil connected across the output of said tachometer generator and having contact means arranged in circuit with said additional rheostat means connected across said source of control voltage with said contact means also in circuit with one of said plurality of field exciting windings for said amplidyne generator exciter for providing a speed limit to the generator excitation recalibrated by steering rheostat positioning.

8. An electrical control system for a self-powered vehicle having a left hand drive motor and a right hand drive motor, and having separate excitation means for said left hand drive motor and for said right hand drive motor, said means comprising a source of control power and for each motor an amplidyne exciter having a plurality of control field windings, one comprising a forward or reverse field winding and another comprising a steering field winding, a plurality of two steering rheostats adapted to be operated together and connected to said source of control power, said rheostats arranged each in series with one of said steering field windings, a plurality of two forward and reverse rheostats adapted to be operated together and each in series with one of said forward and reverse fields, commutating fields for said vehicle motors, a blocking rectifier, means for deriving a fixed voltage from said source of control power, and means for energizing said forward and reverse rheostats through said blocking rectifier from the difference between the drop across said commutating poles and said fixed voltage whereby there may be provided for said vehicle a current control system providing minimum permissible line current modulated by positioning of said rheostats.

9. An electric control system comprising a D. C. generator and a D. C. motor having its armature connected in loop circuit with the armature of said generator, excitation means for said motor including at least one dynamoelectric machine field exciting winding, means responsive to current in said loop circuit for producing a voltage proportional to the value of said loop current, a source of constant voltage, means including a blocking rectifier arranged in circuit with said variable voltage and said constant voltage and said field exciting winding for exciting said motor only when said variable voltage exceeds said constant voltage thereby to prevent motor excitation except when motor armature current exceeds a predetermined minimum value, and means including a supervisory controlled potentiometer rheostat interposed in the circuit of said last means including blocking rectifier, constant voltage, variable voltage and field exciting winding, thereby to co-relate permissible minimum loop current limit with supervisory control positioning.

JOHN C. AYDELOTT.
GEORGE W. BOWER.
GEORGE M. ADAMS.

REFERENCES CITED

The following references are of record in the file of this patent:

UNITED STATES PATENTS

| Number | Name | Date |
|---|---|---|
| 1,922,226 | Wilson et al. | Aug. 15, 1933 |
| 2,348,695 | Reichert | May 9, 1944 |
| 2,356,152 | Edwards et al. | Aug. 22, 1944 |
| 2,397,476 | Maxson et al. | Apr. 2, 1946 |
| 2,534,917 | King | Dec. 19, 1950 |

OTHER REFERENCES

Article by W. E. C. Lampert, "Naval Applications of Electrical Remote-Positional Controllers," Feb. 6, 1947, pp. 246 and 247.